US012791426B2

(12) United States Patent
Park et al.

(10) Patent No.: US 12,791,426 B2

(45) Date of Patent: Nov. 10, 2026

(54) INDOOR IMAGE QUALITY EVALUATION SYSTEM FOR IMAGE SENSOR

(71) Applicant: Samsung Electronics Co., Ltd., Suwon-si (KR)

(72) Inventors: Kichrl Park, Suwon-si (KR); Soohyuk Kwon, Goyang-si (KR); Youngsoo Kang, Suwon-si (KR); Dongoh Kim, Suwon-si (KR); Byoungho Kong, Suwon-si (KR); Ohyeong Kim, Suwon-si (KR); Dongyoung Song, Suwon-si (KR); Sara Lee, Suwon-si (KR); Seungwan Jeon, Suwon-si (KR); Subin Han, Suwon-si (KR); Junho Han, Suwon-si (KR)

(73) Assignees: SAMSUNG ELECTRONICS CO., LTD., Suwon-si (KR); Posan Industry Co., Ltd., Gyeonggi-do (KR)

( * ) Notice: Subject to any disclaimer, the term of this patent is extended or adjusted under 35 U.S.C. 154(b) by 154 days.

(21) Appl. No.: 18/919,909

(22) Filed: Oct. 18, 2024

(65) Prior Publication Data

US 2025/0189403 A1 Jun. 12, 2025

(30) Foreign Application Priority Data

Dec. 8, 2023 (KR) ........................ 10-2023-0178042

(51) Int. Cl.

*G01M 11/02* (2006.01)
*B25J 19/02* (2006.01)

(Continued)

(52) U.S. Cl.

CPC ........ *G01M 11/0257* (2013.01); *B25J 19/023* (2013.01); *B25J 19/04* (2013.01);

(Continued)

(58) Field of Classification Search

None

See application file for complete search history.

(56) References Cited

U.S. PATENT DOCUMENTS

| | | | | |
|---|---|---|---|---|
| 8,300,103 B2 | 10/2012 | He | | |
| 2007/0019272 A1 * | 1/2007 | Hillis | .................... | G02B 26/00 359/239 |

(Continued)

FOREIGN PATENT DOCUMENTS

| | | |
|---|---|---|
| JP | 4419265 B2 | 2/2010 |
| JP | 4423770 B2 | 3/2010 |

(Continued)

OTHER PUBLICATIONS

Quanser, "QLabs Virtual QCar," dated Nov. 28, 2022, accessed at https://www.youtube.com/watch?v=9RIPOK0AO8k on Jun. 14, 2026.*

(Continued)

*Primary Examiner* — Michael J Hess

(74) *Attorney, Agent, or Firm* — Muir Patent Law, PLLC

(57) ABSTRACT

An indoor image quality evaluation system includes an imaging robot on which an image sensor to be evaluated is mounted and which autonomously travels, an indoor studio having a circulation path on which the imaging robot moves, subjects arranged along the circulation path, an adjustable light configured to provide different imaging environments for the subjects, and a management server configured to control the imaging robot, the adjustable light, and the image sensor.

15 Claims, 11 Drawing Sheets

(51) Int. Cl.
*B25J 19/04* (2006.01)
*G06T 7/00* (2017.01)

(52) U.S. Cl.
CPC ......... *G01M 11/0214* (2013.01); *G06T 7/001* (2013.01); *G06T 2207/30252* (2013.01)

(56) References Cited

U.S. PATENT DOCUMENTS

| | | | | |
|---|---|---|---|---|
| 2019/0045162 | A1* | 2/2019 | Krestyannikov ...... | H04N 23/71 |
| 2021/0162912 | A1* | 6/2021 | Spero .................... | F21S 41/153 |
| 2022/0360683 | A1* | 11/2022 | Numata ............... | H04N 1/3876 |
| 2023/0003366 | A1* | 1/2023 | Choi ......................... | F21S 8/00 |

FOREIGN PATENT DOCUMENTS

| | | | |
|---|---|---|---|
| KR | 10-0809553 | B1 | 3/2008 |
| KR | 10-2008-0086230 | A | 9/2008 |
| KR | 10-0916255 | B1 | 9/2009 |
| KR | 10-1090594 | B1 | 12/2011 |
| KR | 10-1673203 | B1 | 11/2016 |

OTHER PUBLICATIONS

Mashable, “Researchers at MIT Built a Mini City To Test Alrorithms for Autonomous Cars | Mashable,” Feb. 22, 2023 accessed at https://www.youtube.com/watch?v=22k9kgJljo on Jun. 14, 2026.*

* cited by examiner

INDOOR IMAGE QUALITY EVALUATION SYSTEM FOR IMAGE SENSOR

CROSS-REFERENCE TO RELATED APPLICATION

This application is based on and claims priority under 35 U.S.C. § 119 to Korean Patent Application No. 10-2023-0178042, filed on Dec. 8, 2023, in the Korean Intellectual Property Office, the disclosure of which is incorporated by reference herein in its entirety.

BACKGROUND

Aspects of the inventive concept relate to an indoor image quality evaluation system capable of carrying out an image quality evaluation on an image sensor indoors, and more particularly, to an indoor image quality evaluation system including an imaging robot on which an image sensor to be evaluated is mounted and which autonomously travels, an indoor studio having a circulation path on which the imaging robot moves, subjects (e.g., sculptures) arranged along the circulation path, an illumination means (e.g., adjustable light) configured to provide different imaging environments for the subjects, and a management server configured to control the imaging robot, the illumination means, and the image sensor.

An image sensor converts light indicating image information input to a camera lens into a digital signal and is widely used in cellular phone cameras, digital cameras, closed circuit televisions (CCTVs), autonomous vehicles, and the like. Such an image sensor undergoes various image quality evaluation procedures at a development stage, and for this purpose, various image quality evaluation devices have been developed.

For example, Korean Patent Registration No. 10-1090594 (Dec. 1, 2011) discloses an image quality evaluation device and method for an image sensor, which are capable of implementing various color temperatures by using a light source having a single color temperature and a filter and implementing a wide illumination environment while constantly maintaining these color temperatures, the light source being an artificial light source used for image sensor evaluation.

In addition, Korean Patent Registration No. 10-1673203 (Nov. 1, 2016) discloses a testing device for testing camera image quality, which is capable of smoothly performing a focusing work or an image test of a camera module having a super-wide-angle lens (a fisheye lens) with an imaging angle of greater than 180 degrees by applying a geodesic dome design scheme to the testing device.

However, these existing evaluation methods and devices were developed to evaluate the image quality of an image of a limited subject captured under a limited condition. Therefore, to evaluate the image quality of an image of each of various subjects captured under various outdoor conditions, experimenters go outdoors, image various subjects, then return to an indoor laboratory, and carry out an evaluation work on the captured images.

SUMMARY

According to the related art, because an image quality evaluation work on an image sensor is carried out outdoors, much time and costs are required, and in particular, a case where an image quality evaluation work cannot be performed due to bad weather frequently occurs according to weather conditions.

One or more aspects of the inventive concept may provide a new indoor image quality evaluation system capable of dramatically saving time and costs required for image quality evaluation of an image sensor, by providing an environment in which various subjects are imaged indoors under the same condition as outdoors to evaluate the image quality of the image sensor.

One or more aspects of the inventive concept may also provide an indoor image quality evaluation system capable of easily evaluating the image quality of an image sensor regardless of a weather condition or a working time by carrying out a work for capturing an image to evaluate the image quality of the image sensor and an evaluation work on the captured image one-stop without changing locations.

According to an aspect of the inventive concept, an indoor image quality evaluation system for an image sensor includes an imaging robot on which the image sensor to be evaluated is mounted and which autonomously travels; an indoor studio partitioned into a plurality of areas and having a circulation path on which the imaging robot moves; a plurality of subjects arranged along the circulation path such that the image sensor captures an image to be evaluated of a subject of the plurality of subjects, the system being configured to evaluate at least one of a high dynamic range (HDR), detail sharpness, moire, and a color error of the image to be evaluated; an adjustable light configured to provide illuminances and color temperatures in different imaging environments for the plurality of subject sculptures; and a management server configured to control a movement and an operation of the imaging robot and an illuminance and a color temperature of the adjustable light according to an imaging scenario that is preset and control the imaging robot to capture the image to be evaluated by matching a field of view (FOV) of the image sensor to an FOV of a master image that was previously captured, wherein the management server is further configured to evaluate the image to be evaluated by determining whether the image is of acceptable or unacceptable quality based on a degree of similarity between the image to be evaluated and the master image.

The imaging robot may include a body, a robot moving portion beneath the body and configured to move the imaging robot according to the imaging scenario input to the management server, a robot arm on the body and having a plurality of joints, a sensor jig at a distal end of the robot arm and supporting the image sensor, and a wireless communication interface provided inside the body to communicate with the management server.

The management server may include an interface configured to input the imaging scenario with pre-captured master images, an imaging robot operator configured to move the imaging robot to an imaging position of a pre-captured master image of the pre-captured master images according to the imaging scenario, a sensor image recognizer configured to recognize in real-time an image captured by the image sensor at the imaging position of the pre-captured master image, a sensor FOV adjuster configured to match the FOV of the image sensor to the FOV of the pre-captured master image, an imaging environment recognizer configured to recognize an illuminance of a subject and a color temperature of light supplied to the subject, an adjustable light controller configured to control the illuminance and the color temperature of the adjustable light, and an image-to-be-evaluated capturer configured to control the image sensor to generate the image to be evaluated by imaging the subject.

According to an aspect of the inventive concept, an image evaluation system includes an imaging robot comprising a robot moving portion and a robot arm; an image sensor mounted on the robot arm; an indoor studio in which the imaging robot is configured to move; subjects arranged in the indoor studio; an adjustable light configured to adjust imaging environments of the subjects; and a management server configured to: move the imaging robot to a position in the indoor studio corresponding to a position at which a master image has been captured; using the robot arm, adjust a field of view (FOV) of the image sensor to correspond to the FOV of the master image; adjust an illumination condition of the indoor studio to correspond to the illumination condition of the master image; capture an image of one of the subjects using the image sensor; and evaluate the captured image by determining whether the captured image is of acceptable or unacceptable quality based on a degree of similarity between the captured image and the master image.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
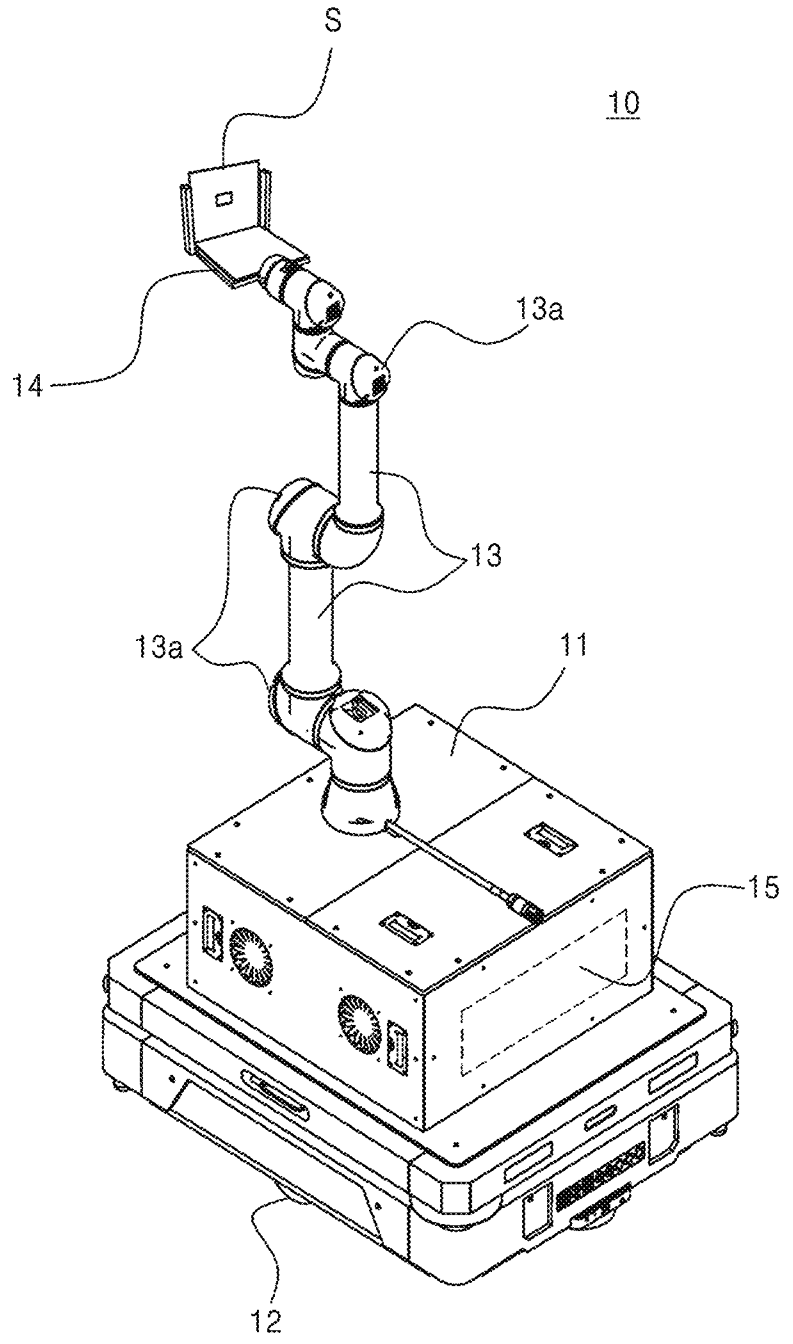
FIG. 1 is a perspective view of an imaging robot according to an embodiment.

Hereinafter, the inventive concept is described in detail with reference to the accompanying drawings. However, because the accompanying drawings illustrate embodiments, the scope of the inventive concept is not limited to the embodiments. In addition, even though a feature may be essential to carry out the inventive concept, if the feature is disclosed in the related art or could be easily carried out by those of ordinary skill in the art from well-known features, a particular description of the feature is omitted.

In addition, the term such as "... unit" or "... means" among components belonging to the inventive concept refers to a unit that performs at least one function or operation and may be implemented as hardware, software, or as a combination thereof. In addition, when a certain part "includes" a certain component, this indicates that the part may further include another component in accordance with circumstances.

An indoor image quality evaluation system for an image sensor, according to the inventive concept, includes an imaging robot 10 on which an image sensor S to be evaluated is mounted and which autonomously travels, an indoor studio 20 having a circulation path 21 on which the imaging robot 10 moves, subjects (e.g., subject sculptures) 30 arranged along the circulation path 21, an adjustable light (e.g., an illumination means) 40 configured to provide different imaging environments for the subjects 30, and a management server 50 configured to control the imaging robot 10, the illumination means 40, and the image sensor S.

In the present disclosure, the term "master image" indicates an image of each of the subjects 30 captured in advance (e.g., by a properly calibrated and fully functional camera) to evaluate the image quality of the image sensor S through comparison. In addition, the term "image to be evaluated" indicates an image of each subject 30 captured using the image sensor S to be evaluated according to the inventive concept. The subject 30 is also used to capture in advance the corresponding master image.

First, the imaging robot 10 may autonomously travel along the circulation path 21 of the indoor studio 20 according to an imaging scenario input to the management server 50 in advance in a state of mounting the image sensor S thereon. The image sensor S is to be evaluated by the indoor image quality evaluation system according to the inventive concept and may be used in typical digital cameras, smartphones, autonomous vehicles, and the like.

FIG. 1 illustrates the imaging robot 10 according to an embodiment, which may include a body portion 11 (e.g., a body), a robot moving portion 12, a robot arm 13, a sensor jig 14, and a wireless communication interface 15.

The imaging robot 10 is moved by the robot moving portion 12, provided beneath the body portion 11, to a position where a master image was captured, according to the imaging scenario input to the management server 50. The robot moving portion 12 may be the same as a moving means of a typical autonomous robot and may include, for example, a motor, moving wheels, and a steering mechanism.

The robot arm 13 is provided on the body portion 11 of the imaging robot 10 and has a plurality of joint portions 13*a* (e.g., joints). In addition, the sensor jig 14 is provided at the distal end of the robot arm 13 and supports the image sensor S. Therefore, the image sensor S may approach or be moved away from the subject 30 by an operation of the robot arm 13 to adjust a field of view (FOV). The robot arm 13 may be movable using one or more motors or actuators to adjust positions and/or orientations of each of the joint portions 13*a*. The joint portions 13*a* may be moved together or independently of each other using the one or more motors or actuators. The motors and joints of the robot arm 13 and the motor and steering mechanism of the robot moving portion 12 may be autonomously controlled and/or may be controlled wirelessly, for example.

Finally, the wireless communication interface 15 is provided inside the body portion 11 to communicate with the management server 50. That is, the imaging robot 10 communicates with the management server 50 through the wireless communication interface 15 and the robot moving portion 12, the robot arm 13, and the image sensor S mounted on the sensor jig 14 are controlled according to the imaging scenario input to the management server 50.

The imaging scenario may include an imaging position of each master image that is previously captured, an imaging environment for and the number of imaging times of an image to be evaluated which the image sensor S is to capture, and the like. The imaging scenario is input to the management server 50 in advance before the indoor image quality evaluation system according to the inventive concept operates.

Figure 2:
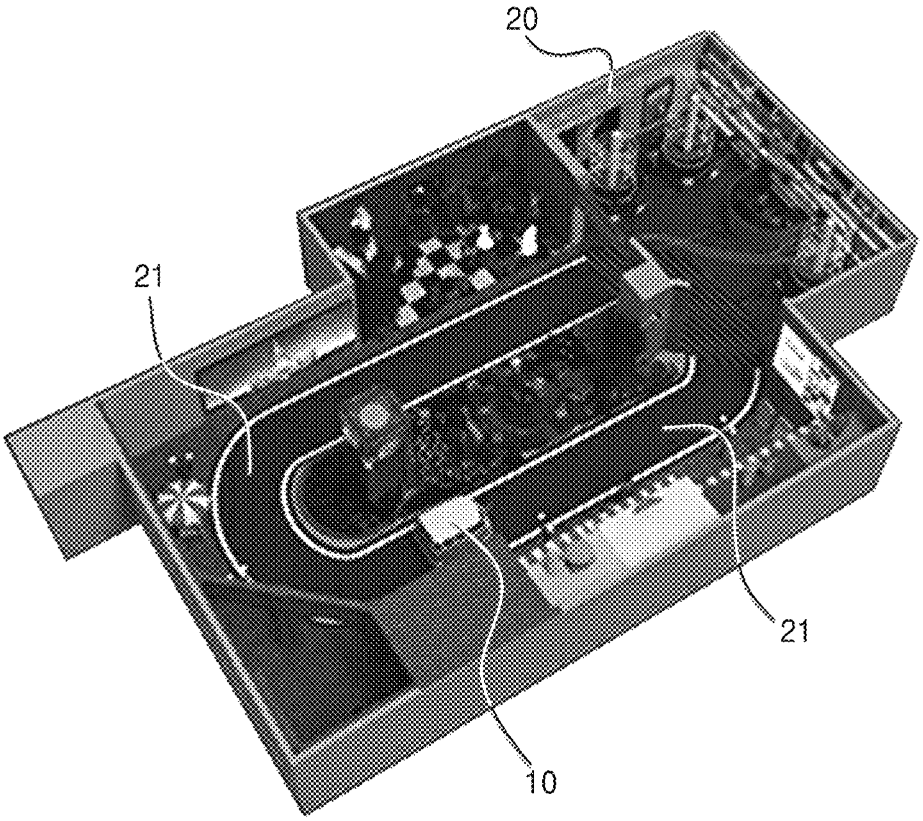
FIG. 2 is a perspective view of an indoor studio according to an embodiment.
Figure 3:
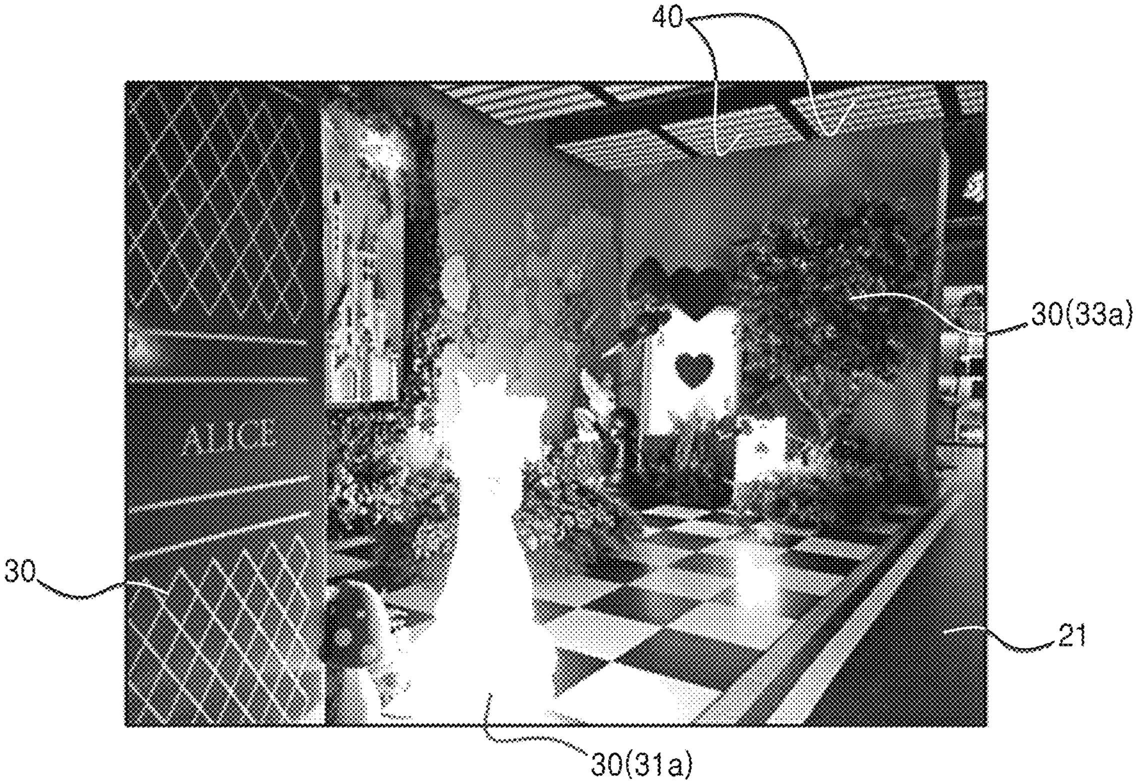
FIGS. 3 to 7 are real photographs illustrating subject sculptures and an illumination means provided in the indoor studio.
Figure 4:
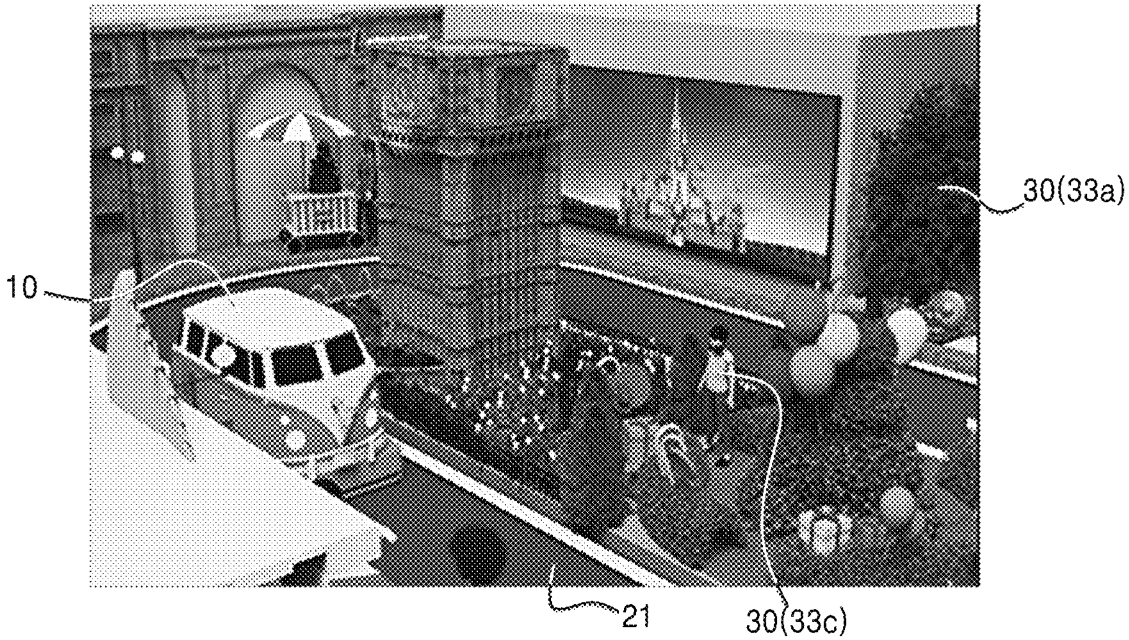
Figure 5:
Figure 6:
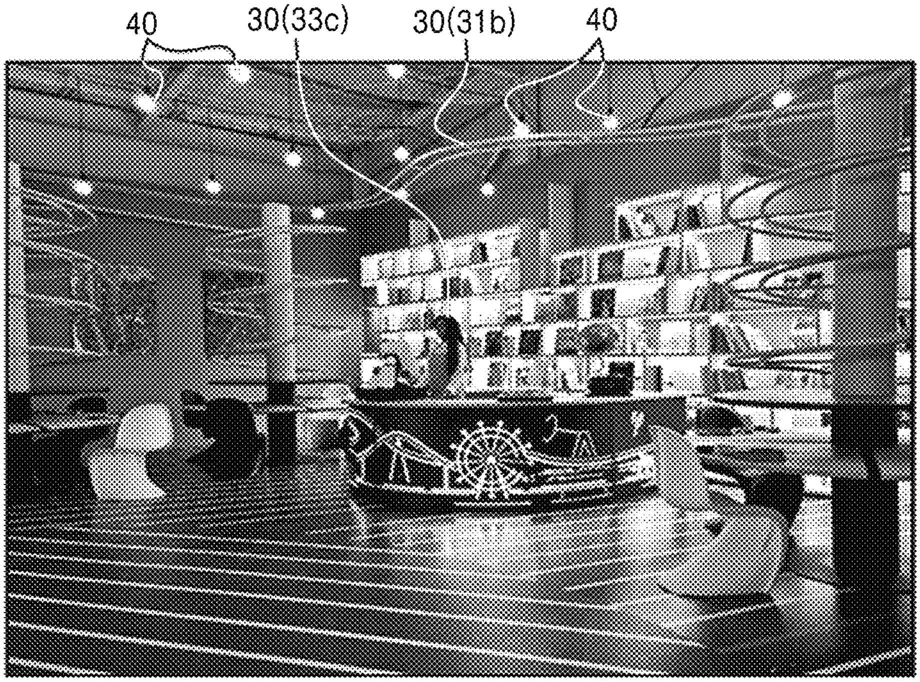
Figure 7:
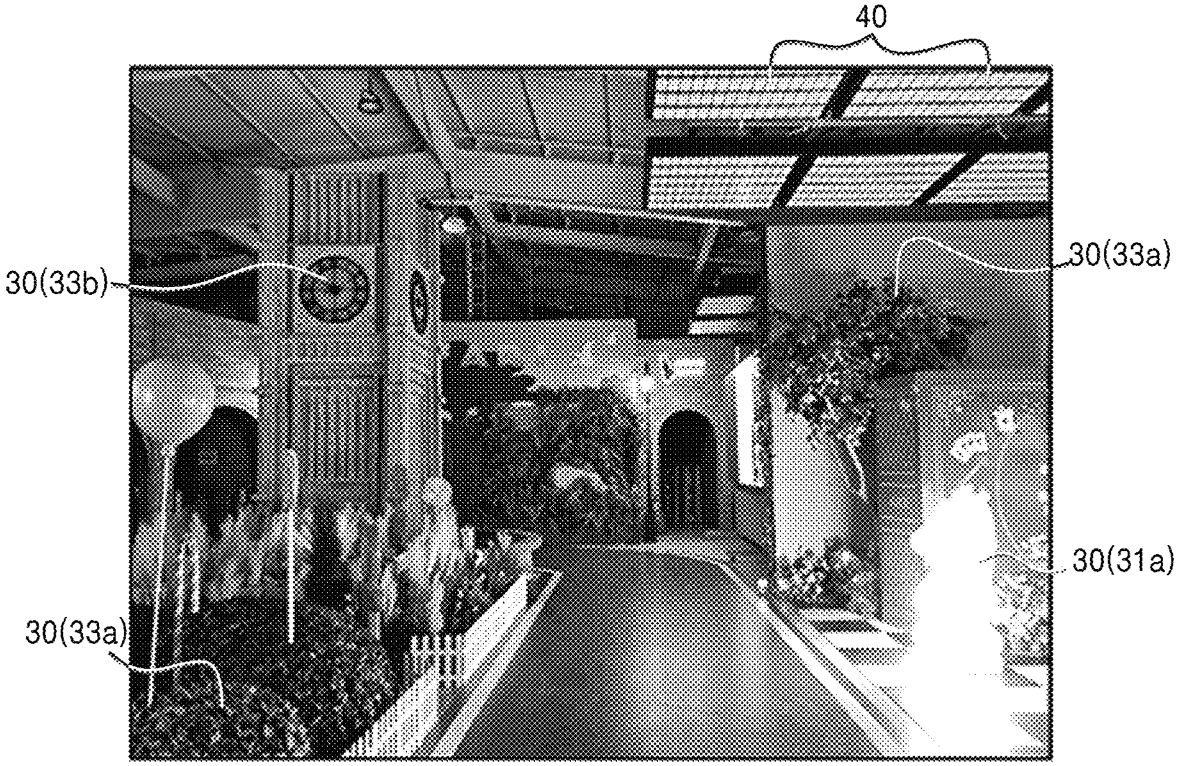

Next, the indoor studio 20 may have an imaging zone provided indoors, as shown in FIG. 2, and may include the circulation path 21 on which the imaging robot 10 moves. In the imaging zone, position coordinates are set in the X-axis and Y-axis directions such that an imaging position of a master image of each subject sculpture 30 can be associated with position coordinates of the imaging zone. The imaging robot 10 may map the position coordinates of the indoor studio 20 while traveling along the circulation path 21 in an initial stage before image evaluation is performed.

The subjects 30 are arranged along the circulation path 21 of the indoor studio 20 such that the image sensor S mounted on the imaging robot 10 captures an image to be evaluated. The subjects 30 are designed to enable the evaluation of at least one of the high dynamic range (HDR), the detail sharpness, the moire, and a color error of the image to be evaluated. For example, the subjects 30 may be implemented as a cafe or restaurant interior, a city downtown, an amusement park, a park, a clock tower, a statue, a street tree, and the like, as shown in FIGS. 3 to 7.

A subject of which the HDR is to be evaluated among the subjects 30 is a subject which emits light noticeably brighter than the surroundings or reflects the light and may include at least one of an animal sculpture 31*a* (see, e.g., FIG. 3) that is a translucent white animal sculpture with a light-emitting body provided therein, a metal pipe 31*b* (see, e.g., FIG. 6) coated with a paint to reflect light of a lamp, and a wall surface 31*c* (see, e.g., FIG. 5) reflecting the light of the lamp.

Herein, HDR indicates a technique of expanding a dynamic range (DR) of an image as if a human were actually viewing a subject, by making bright points brighter and dark points darker in a digital image. As a reference, the term "DR" indicates a range from the brightest point to the darkest point.

A DR perceived by the eyes of a human being is about 10,000 knit, but an image input to an existing typical display is about 100 knit, and thus, implementing realistic image quality is limited. Therefore, HDR evaluation is used to evaluate whether images having various shades of brightness existing in the real world from the intense light of the sun to the star light in the dark night sky represent the same color temperatures as the real color temperatures through the contrast ratio of an image.

Next, a subject of which the moire is to be evaluated may include, for example, a tempered board 32*a* (see, e.g., FIG. 5) covering a wall surface. The term "moire" also refers to an interference pattern, a wave pattern, or a grid pattern and indicates a stripe pattern visually made due to a cycle difference (e.g., a difference between periods of the patterns) when regularly repeated shapes are superimposed several times.

A subject of which the moire is to be evaluated has a stripe pattern or a grid pattern densely arranged. Therefore, a moire phenomenon may be evaluated by observing whether a stripe pattern or a grid pattern is cut or overlayed on another in an image obtained by imaging the subject.

In addition, a subject of which the detail sharpness is to be evaluated may include at least one of an artificial plant 33*a* (see, e.g., FIG. 4), a circular clock 33*b* (see, e.g., FIG. 7), a mannequin face 33*c* (see, e.g., FIG. 6), and a character plate 33*d* (see, e.g., FIG. 5) to evaluate how sharply the detail of the subject is represented and how sharply the outline of the subject is discriminated from a background.

Figure 8:
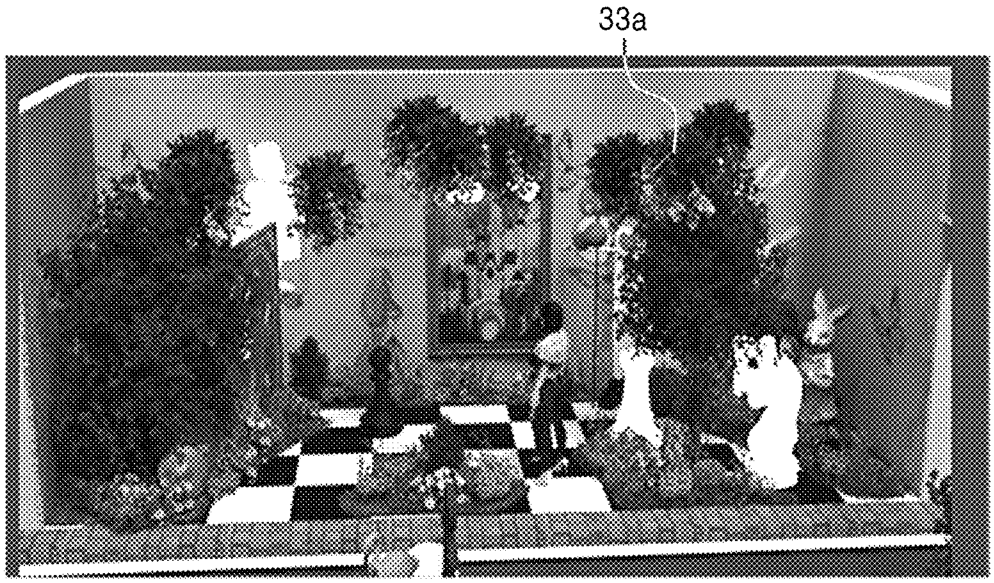
FIGS. 8 and 9 are photographs illustrating states in which the illumination means implements an imaging environment corresponding to a night time.
Figure 9:
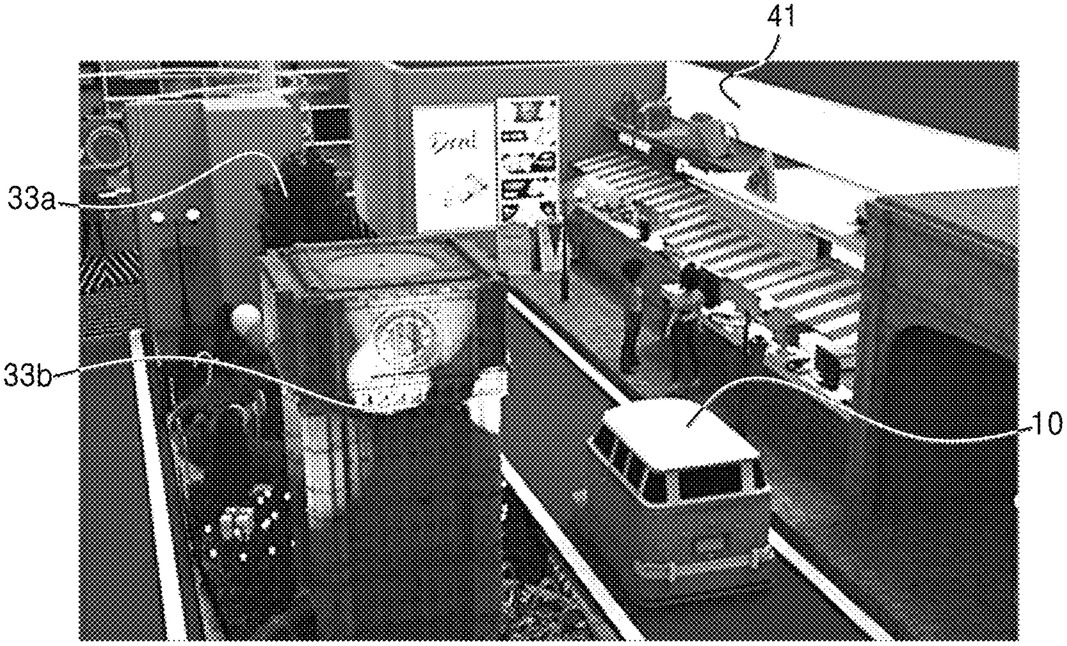

The adjustable light 40 provides imaging environments of different illuminances and color temperatures to each subject 30 and may include a combination of daylight-colored, orange and white, and incandescent bulb-colored light-emitting diodes (LEDs). The adjustable light 40 may be provided on the ceiling of the indoor studio 20 or between the subjects 30 and may provide an imaging environment corresponding to, for example, a day time, a night time, a sunrise time, or a sunset time by properly combining the light intensities of the LEDs of the adjustable light 40. FIGS. 8 and 9 are photographs illustrating states of implementing an imaging environment corresponding to a night time by using the adjustable light 40.

The adjustable light 40 may include a sky background plate 41 on a wall or the ceiling of the indoor studio 20. The sky background plate 41 may include a structure in which an LED backlight is arranged behind a sheet on which an actual image obtained by imaging a figure of white clouds floating in a clear sky is printed out. The backlight of the sky background plate 41 may variously implement a sky state of a day time, a night time, a sunrise time, or a sunset time by combining the daylight-colored, orange and white, and incandescent bulb-colored LEDs.

Finally, the management server 50 may control a movement and an operation of the imaging robot 10 and the illuminance and the color temperature of the adjustable light 40 according to the imaging scenario that is preset and control the imaging robot 10 to capture an image to be evaluated by matching the FOV of the image sensor S to the FOV of a master image that was previously captured. The management server 50 may be at one side of the indoor studio 20 or in an adjacent separate space, or may otherwise be separated from the indoor studio 20 by an arbitrary distance.

Figure 10:
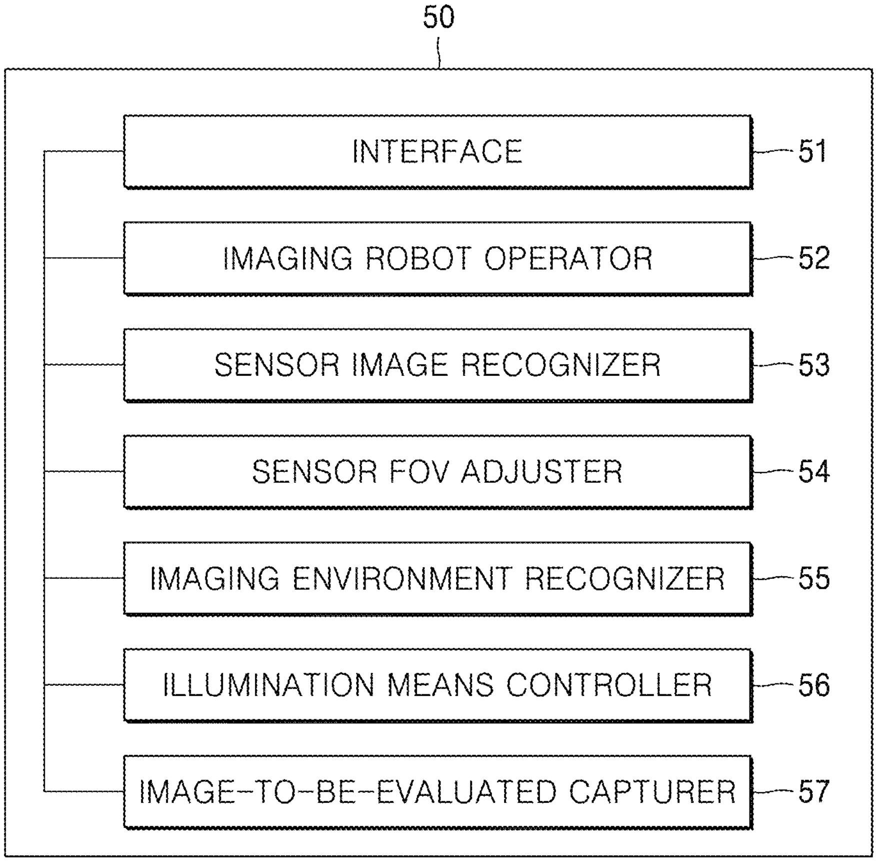
FIG. 10 is a block diagram illustrating a management server according to an embodiment and FIG. 11 is a flowchart illustrating execution of an imaging scenario by using a management server, according to an embodiment.

FIG. 10 is a block diagram of the management server 50 according to an embodiment, which may include an interface 51, an imaging robot operator 52, a sensor image recognizer 53, a sensor FOV adjuster 54, an imaging environment recognizer 55, an illumination means controller 56, and an image-to-be-evaluated capturer 57.

Although not illustrated, the management server 50 may include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to a processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the management server 50 may include antennas, network interfaces that provide wireless and/or wire line digital and/or analog interface to one or more networks over one or more network connections (not shown), a power source that provides an appropriate alternating current (AC) or direct current (DC) to power one or more components of the management server 50, and a bus that allows communication among the various disclosed components of the management server 50.

The management server 50 may be a computer (or several interconnected computers) and may include, for example, one or more processors configured by software, such as a CPU, a graphics processor (GPU), a controller, etc., and may include various functional modules such as an interface 51, an imaging robot operator 52, a sensor image recognizer 53, a sensor FOV adjuster 54, an imaging environment recognizer 55, an illumination means controller 56, and an image-to-be-evaluated capturer 57. Each functional module described herein may include a separate computer, or some or all of the functional module may be included in and share the hardware of the same computer. Connections and interactions between the modules described herein may be hardwired and/or in the form of data (e.g., as data stored in and retrieved from memory of the computer, such as a register, buffer, cache, storage drive, etc., such as part of an application programming interface (API)). The functional modules may each correspond to a separate segment or segments of software (e.g., a subroutine) which configure the computer of the management server 50, and/or may correspond to segment(s) of software that also correspond to one or more other functional modules (or units) described herein (e.g., the functional modules (or units) may share certain segment(s) of software or be embodied by the same segment (s) of software). As is understood, "software" refers to prescribed rules to operate a computer, such as code or script.

Figure 11:
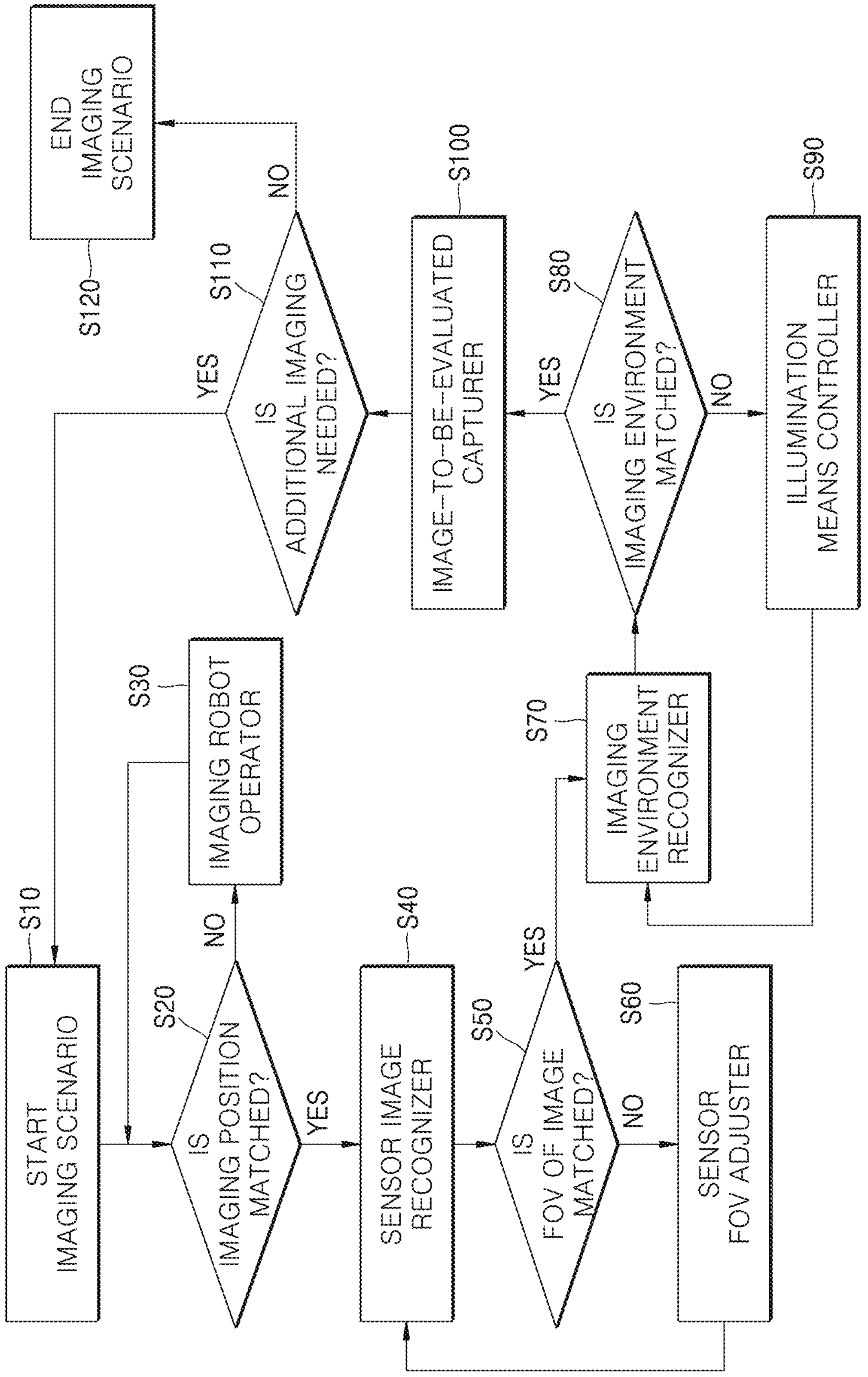

FIG. 11 is a flowchart illustrating execution of an imaging scenario by using the management server 50, according to the inventive concept.

First, in step S10, the interface 51 provides a means for a user to input an imaging scenario with pre-captured master images. The interface 51 may include a screen with various conditions of input windows, a keyboard, and the like, and the screen may include a touch screen. The pre-captured master images may be captured in advance by the user or by another operator. The imaging scenario may include a position of the camera used to capture the pre-captured master images, a field of view of the camera used to capture the pre-captured master images, and one or more illumination conditions present when the pre-captured master images are captured. For example, the pre-captured master images and the position of the camera may be provided by the camera or by an operator of the camera to a computer and stored. For example, the illumination conditions present when the pre-captured master images are captured may be provided by the adjustable light 40 or by an operator performing the capturing of the pre-captured master images to the computer and stored. The user may then input the stored imaging scenario to the interface 51. As another example, the user may manually enter the imaging scenario to the interface 51.

The input imaging scenario may be stored, e.g., in a database connected to the management server 50.

Then, in step S20, the imaging robot operator 52 may determine whether the imaging robot 10 is located in a position that matches the position of a pre-captured master image. If the imaging robot 10 is located in a matching position, then the operation proceeds to step S40.

Next, in step S30, if the imaging robot 10 is not located in a matching position, then the imaging robot operator 52 may move the imaging robot 10 to an imaging position of a master image such that the image sensor S captures an image to be evaluated according to the imaging scenario. To this end, the imaging robot operator 52 may control the robot moving portion 12 by using the position coordinates of the indoor studio 20. For example, precise imaging positions (e.g., a position at which a camera was located when capturing an image, also described as an image capture device position) for master images captured in the indoor studio 20 may be stored, and may be communicated to the imaging robot 10.

In step S40, the sensor image recognizer 53 may recognize an image of a subject sculpture 30 captured by the image sensor S in a state in which the imaging robot 10 arrives at the imaging position of the master image. In addition, at step S50, the sensor FOV adjuster 54 may determine whether the FOV of the image to be captured by the image sensor S matches the FOV of the master image. If the FOV of the image to be captured by the image sensor S does not match the FOV of the master image, then at step S60, the sensor FOV adjuster 54 may control the robot arm 13 of the imaging robot 10 such that the FOV of the image captured by the image sensor S matches the FOV of the master image. In this case, the sensor FOV adjuster 54 may match both the FOVs according to an essential matrix scheme while checking an image captured by the image sensor S in real-time. If the FOV of the image to be captured by the image sensor S matches the FOV of the master image, then the operation proceeds to step S70.

At step, S70, the imaging environment recognizer 55 may recognize (e.g., measure) an imaging environment (e.g., an illumination condition), i.e., the illuminance of the subject 30 and the color temperature of light supplied to the subject 30. At step S80, the illumination means controller 56 may determine whether the recognized imaging environment matches the imaging environment included in the imaging scenario. If the recognized imaging environment does not match the imaging environment included in the imaging scenario, then at step S90, the adjustable light controller 56 may control the illuminance and the color temperature of the adjustable light 40 to match the imaging environment for the subject 30 to an imaging environment included in the imaging scenario. If the recognized imaging environment matches the imaging environment included in the imaging scenario, then the operation proceeds to step S100.

Finally, at step 100, the image-to-be-evaluated capturer 57 may control the image sensor S to generate an image to be evaluated by imaging the subject 30. The image to be evaluated, which is generated according to these procedures, is sequentially stored in the management server 50.

In this manner, a first image to be evaluated corresponding to a first master image is captured for a first subject 30. At step S110, the management server 50 determines whether additional imaging is needed, e.g., of the same subject under a different imaging environment or of a different subject. Then, if additional imaging is needed, the imaging robot 10 moves to an imaging position of a second master image according to the imaging scenario, and a second image to be evaluated corresponding to the second master image is captured for a second subject 30 (or, e.g., for the first sculpture under a different imaging scenario or under a different imaging environment) in the same procedures beginning with step S10. In one or more embodiments, instead of moving to another imaging position, the imaging robot 10 may remain in the same imaging position and the imaging environment may be changed so that a second image may be captured of the first subject under the different imaging environment.

If additional imaging is not needed, then the operation ends at step S120.

If all imaging procedures according to the imaging scenario are completed, the management server 50 may directly evaluate images to be evaluated by comparing the images to be evaluated to master images or transmit the images to be evaluated and the master images to a separate image analysis server (not shown).

While the inventive concept has been particularly shown and described with reference to embodiments thereof, it will be understood that various changes in form and details may be made therein without departing from the spirit and scope of the disclosure.

What is claimed is:

1. An indoor image quality evaluation system for an image sensor, the system comprising:

an imaging robot on which the image sensor to be evaluated is mounted and which autonomously travels;

an indoor studio partitioned into a plurality of areas and having a circulation path on which the imaging robot moves;

a plurality of subjects arranged along the circulation path such that the image sensor captures an image to be evaluated of a subject of the plurality of subjects, the system being configured to evaluate at least one of a high dynamic range (HDR), detail sharpness, moire, and a color error of the image to be evaluated;

an adjustable light configured to provide illuminances and color temperatures in different imaging environments for the plurality of subjects; and a management server configured to control a movement and an operation of the imaging robot and an illuminance and a color temperature of the adjustable light according to an imaging scenario that is preset and control the imaging robot to capture the image to be evaluated by matching a field of view (FOV) of the image sensor to an FOV of a master image that was previously captured, wherein the management server is further configured to evaluate the image to be evaluated by determining whether the image is of acceptable or unacceptable quality based on a degree of similarity between the image to be evaluated and the master image.

2. The indoor image quality evaluation system of claim 1, wherein the imaging robot comprises:

a body;

a robot moving portion beneath the body and configured to move the imaging robot according to the imaging scenario input to the management server;

a robot arm on the body and having a plurality of joints;

a sensor jig at a distal end of the robot arm and supporting the image sensor; and a wireless communication interface provided inside the body, the wireless communication interface being configured to communicate with the management server.

3. The indoor image quality evaluation system of claim 1, wherein the indoor image quality evaluation system is configured to set spatial coordinates in the indoor studio such that an imaging position of a master image of each subject can be associated with the spatial coordinates.

4. The indoor image quality evaluation system of claim 1, wherein a subject of which an HDR is to be evaluated among the plurality of subjects comprises at least one of: an animal sculpture that is a translucent white animal sculpture with a light-emitting body provided therein, a metal pipe coated with a paint to reflect light of a lamp, and a wall surface reflecting the light of the lamp.

5. The indoor image quality evaluation system of claim 1, wherein a subject of which detail sharpness is to be evaluated comprises at least one of: an artificial plant, a circular clock, a mannequin face, and a character plate.

6. The indoor image quality evaluation system of claim 1, wherein the adjustable light comprises a sky background plate on a wall or a ceiling of the indoor studio, the sky background plate comprising a backlight with daylight-colored, orange and white, and incandescent bulb-colored light-emitting diodes (LEDs) arranged behind a sheet on which an actual image obtained by imaging a figure of white clouds floating in a clear sky is printed out.

7. The indoor image quality evaluation system of claim 1, wherein the management server comprises:

an interface configured to input the imaging scenario with pre-captured master images;

an imaging robot operator configured to move the imaging robot to an imaging position of a pre-captured master image of the pre-captured master images according to the imaging scenario;

a sensor image recognizer configured to recognize in real-time an image captured by the image sensor at the imaging position of the pre-captured master image;

a sensor FOV adjuster configured to match the FOV of the image sensor to the FOV of the pre-captured master image;

an imaging environment recognizer configured to recognize an illuminance of a subject and a color temperature of light supplied to the subject;

an adjustable light controller configured to control the illuminance and the color temperature of the adjustable light; and an image-to-be-evaluated capturer configured to control the image sensor to generate the image to be evaluated by imaging the subject.

8. An image evaluation system comprising:

an imaging robot comprising a robot moving portion and a robot arm;

an image sensor mounted on the robot arm;

an indoor studio in which the imaging robot is configured to move;

subjects arranged in the indoor studio;

an adjustable light configured to adjust imaging environments of the subjects; and a management server configured to:

move the imaging robot to a position in the indoor studio corresponding to a position at which a master image has been captured;

using the robot arm, adjust a field of view (FOV) of the image sensor to correspond to the FOV of the master image;

adjust an illumination condition of the indoor studio to correspond to the illumination condition of the master image;

capture an image of one of the subjects using the image sensor; and evaluate the captured image by determining whether the captured image is of acceptable or unacceptable quality based on a degree of similarity between the captured image and the master image.

9. The system of claim 8, wherein the management server is further configured to:

measure the illumination condition of an illumination environment of the indoor studio; and adjust the illumination condition of the illumination environment by comparing the measured illumination condition to the illumination condition of the master image.

10. The system of claim 8, wherein the management server is further configured to:

control the imaging robot to move along a circulation path in the indoor studio to capture a plurality of images using the image sensor; and evaluate the plurality of captured images by comparing each of the plurality of captured images to a respective master image of a plurality of master images.

11. The system of claim 10, wherein each of the plurality of captured images corresponds to a subject of the image and an illumination condition of the image.

12. The system of claim 8, wherein the illumination condition includes an illuminance of the subject and a color temperature of light supplied to the subject.

13. The system of claim 8, wherein the management server is further configured to map, using the imaging robot, position coordinates of the indoor studio while traveling along a circulation path of the indoor studio.

14. The system of claim 8, wherein the adjustable light provides illumination conditions of different illuminances and color temperatures to each subject by combining day-light-colored, orange and white, and incandescent bulb-colored light-emitting diodes (LEDs).

15. The system of claim 8, wherein the management server is further configured to evaluate the captured image by evaluating at least one of a high dynamic range (HDR), a moire, a detail sharpness, and a color error of the captured image with respect to the master image.

* * * * *